United States Patent
Eggert, Jr.

[15] 3,650,558
[45] Mar. 21, 1972

[54] VEHICLE CHASSIS FRAME CONSTRUCTION

[72] Inventor: Walter S. Eggert, Jr., Huntingdon Valley, Pa.

[73] Assignee: Boothe Airside Systems, Inc.

[22] Filed: Dec. 31, 1969

[21] Appl. No.: 889,412

[52] U.S. Cl. ..........................296/28 A, 29/155, 285/179, 285/286
[51] Int. Cl. .................................................B62d 31/02
[58] Field of Search................296/28 A; 285/179, 183, 286; 52/475, 656; 29/155

[56] References Cited

UNITED STATES PATENTS

| | | | |
|---|---|---|---|
| 3,537,745 | 11/1970 | Herring | 296/28 A |
| 2,730,385 | 1/1956 | Kuehne | 285/179 |
| 2,731,933 | 1/1956 | Phillips | 285/179 X |
| 968,316 | 5/1910 | Rogers | 285/179 X |
| 2,516,020 | 7/1950 | Reed | 29/155 |
| 1,524,261 | 1/1925 | Kusterle | 285/179 |
| 3,429,602 | 2/1969 | Dirilgen | 52/475 X |

FOREIGN PATENTS OR APPLICATIONS

| | | | |
|---|---|---|---|
| 556,341 | 4/1923 | France | 29/155 |

Primary Examiner—Benjamin Hersh
Assistant Examiner—Leslie J. Paperner
Attorney—Stowell & Stowell

[57] ABSTRACT

This application discloses a vehicle chassis frame construction which provides a strong rigid connection between a longitudinal frame member or beam and a vertical frame member or column which will resist the variously applied loads between the chassis traveling over uneven surfaces and a body or pod which is subject to heavy loading and which is located at various elevations relative to the chassis frame, specifically, the connection involving the angular tubular joint between a horizontal tubular member and a vertical tubular member.

10 Claims, 13 Drawing Figures

Patented March 21, 1972
3,650,558
4 Sheets-Sheet 1
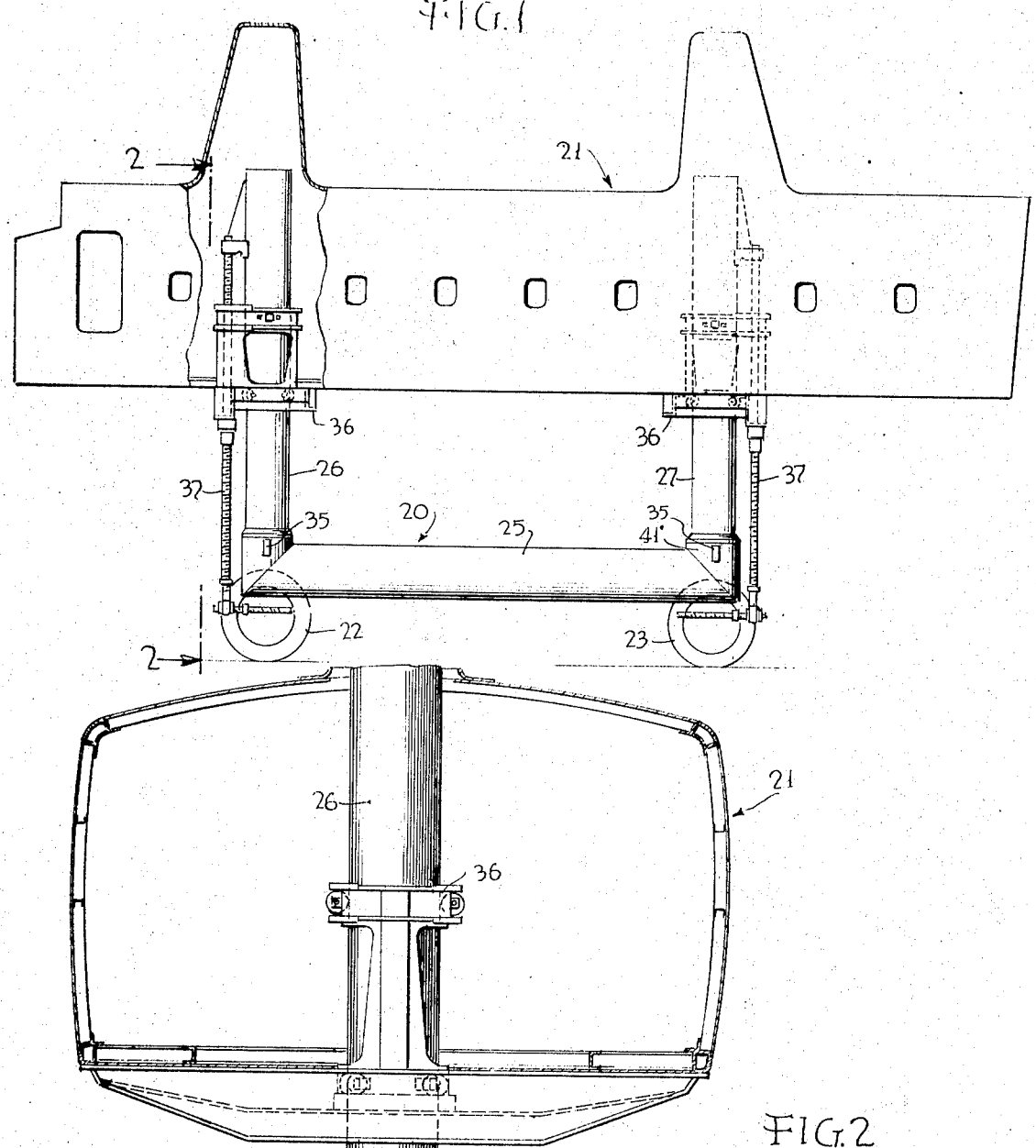
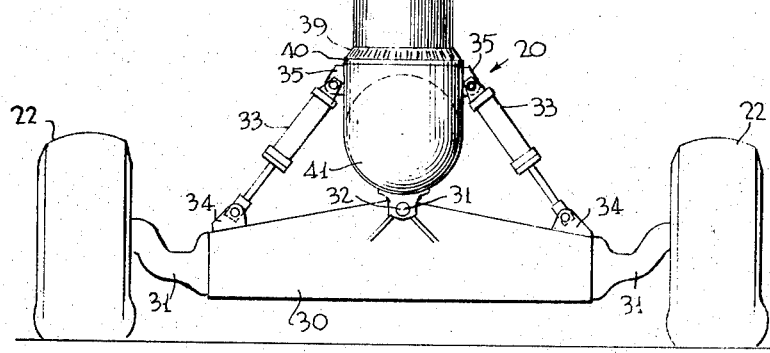
INVENTOR.
Walter S. Eggert, Jr.
ATTORNEY Patented March 21, 1972

INVENTOR.
Walter S. Eggert, Jr.
BY
Edward M. Farrell
ATTORNEY

Patented March 21, 1972

INVENTOR.
Walter S. Eggert, Jr.
BY
Edward M Farrell
ATTORNEY

INVENTOR.
Walter S. Eggert, Jr.
BY
Edward M. Farrell
ATTORNEY 3,650,558

VEHICLE CHASSIS FRAME CONSTRUCTION

BACKGROUND OF INVENTION

Most land vehicles include a body which is mounted at a relatively fixed elevation with respect to the chassis frame on which it is carried. The present invention deals with a vehicle which has a body or pod which is mounted for extensive vertical movement on the chassis, as, specifically, to be raised to an upper level at the floor height of a modern commercial airplane or the loading height of an airport building and to be returned to a normal lower level when the vehicle travels between plane and terminal. When the body is in the elevated position the side loadings imposed on the supporting columns may be very great and these loadings are concentrated where they pass through joints between the columns and the horizontal chassis frame components.

SUMMARY OF INVENTION

The present invention provides a strong transition joint construction between a horizontal chassis frame beam of tubular form and a vertical frame column support of tubular form which will adequately resist all vertical, lateral, and torsional loadings which may be imposed when the body or pod is in elevated position or when it is in lowered position with the heavily loaded vehicle travelling over uneven roadway surfaces.

In the vehicle design shown herein the body is carried on two transversely central columns, one fore and one aft, so that the columns brace each other fairly well in a longitudinal direction, especially since the vehicle never travels any appreciable distance when the body is elevated; but the longitudinal loads and the more severe side loadings must be resisted and the present construction provides suitable reinforcing structure for adequately taking all imposed loadings.

DESCRIPTION OF DRAWINGS

The objects, features, and advantages of the invention will be apparent from the following description of an exemplary embodiment, reference being made to the accompanying drawings thereof, wherein:

FIG. 1 is a side elevation of an air port transfer vehicle with a body or pod shown in broken lines in an elevated position on the chassis;

FIG. 2 is a transverse sectional view as shown in FIG. 1;

DESCRIPTION OF EXEMPLARY EMBODIMENT

Figure 3:
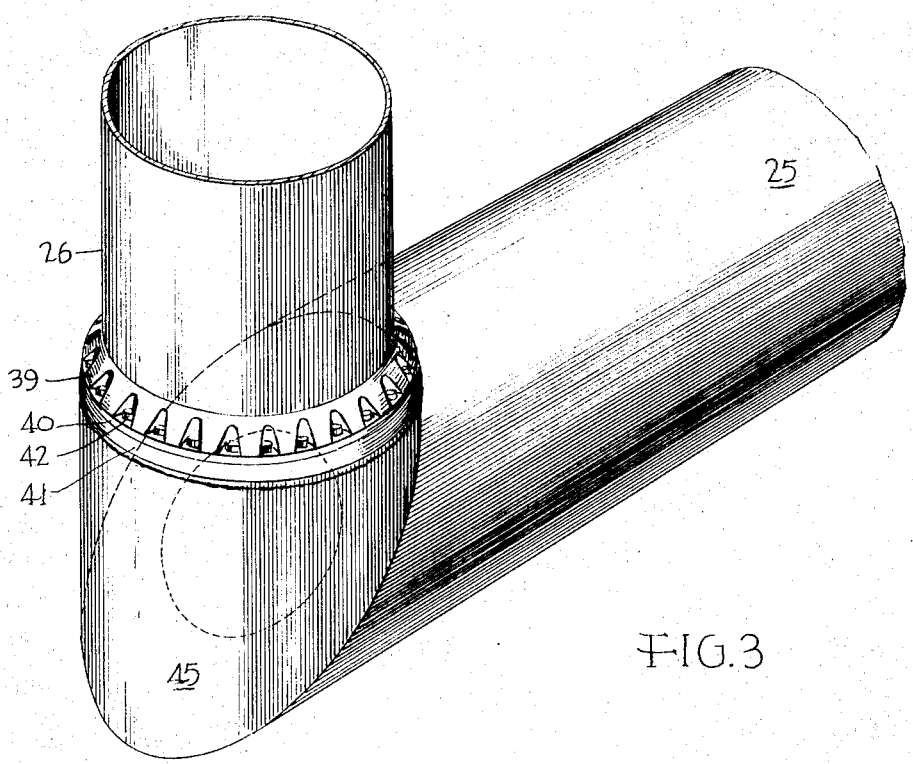
FIG. 3 is a perspective view of the transition joint connection between the horizontal longitudinal chassis frame beam member and the front vertical column or strut member with which the present invention is concerned, certain parts being omitted for clarity of illustration.
Figure 4:
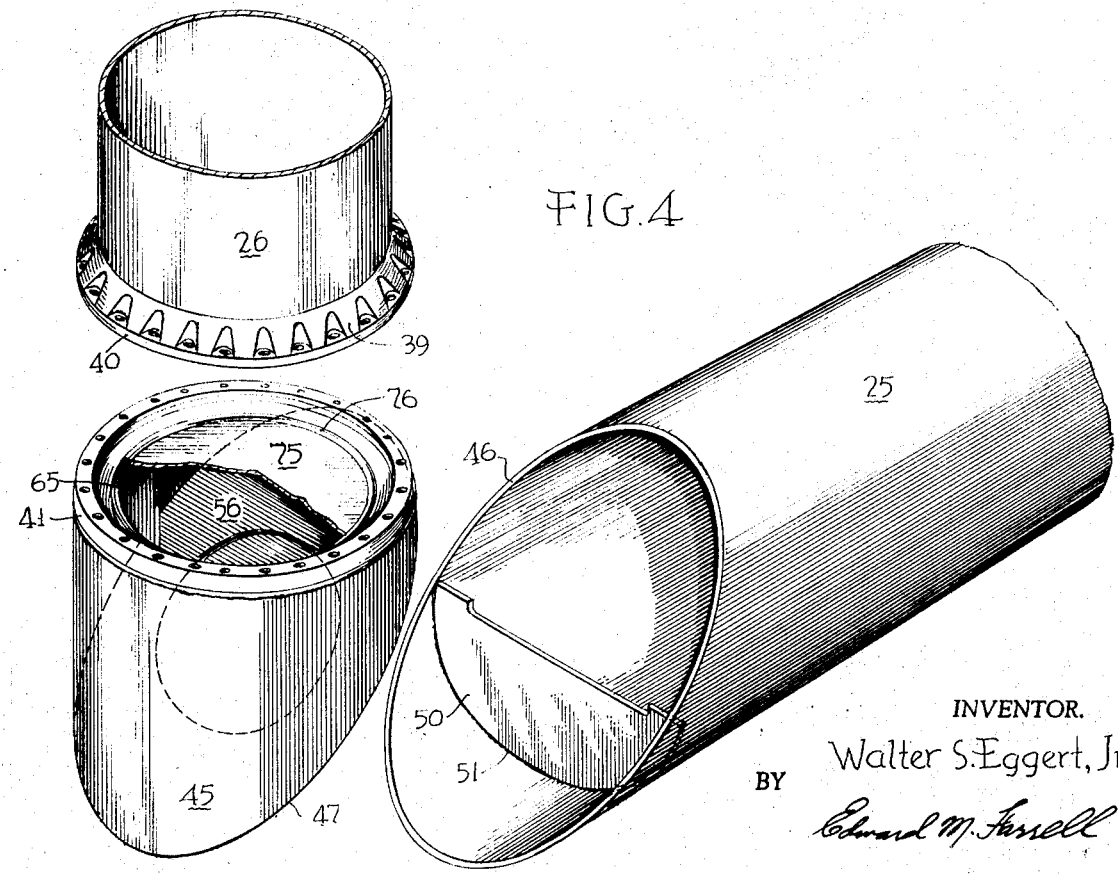
FIG. 4 is a perspective view of the parts shown in FIG. 3 prior to assembly.
Figure 5:
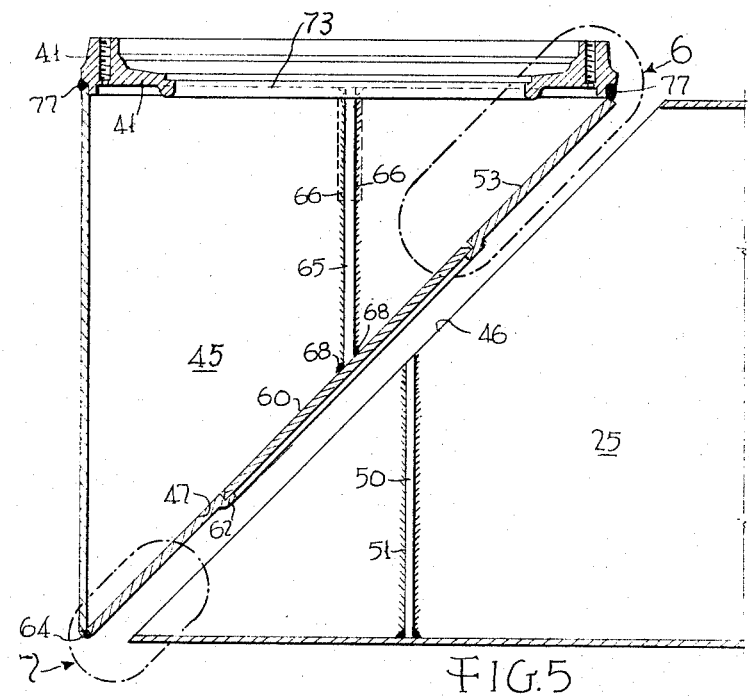
FIG. 5 is an enlarged vertical longitudinal section of the joint connection structure in partially assembled condition.
Figure 6:
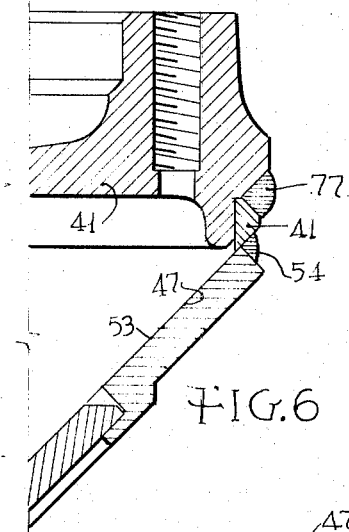
FIG. 6 is a further enlarged sectional view of the parts shown in the upper circled area 6 of FIG. 5.
Figure 8:
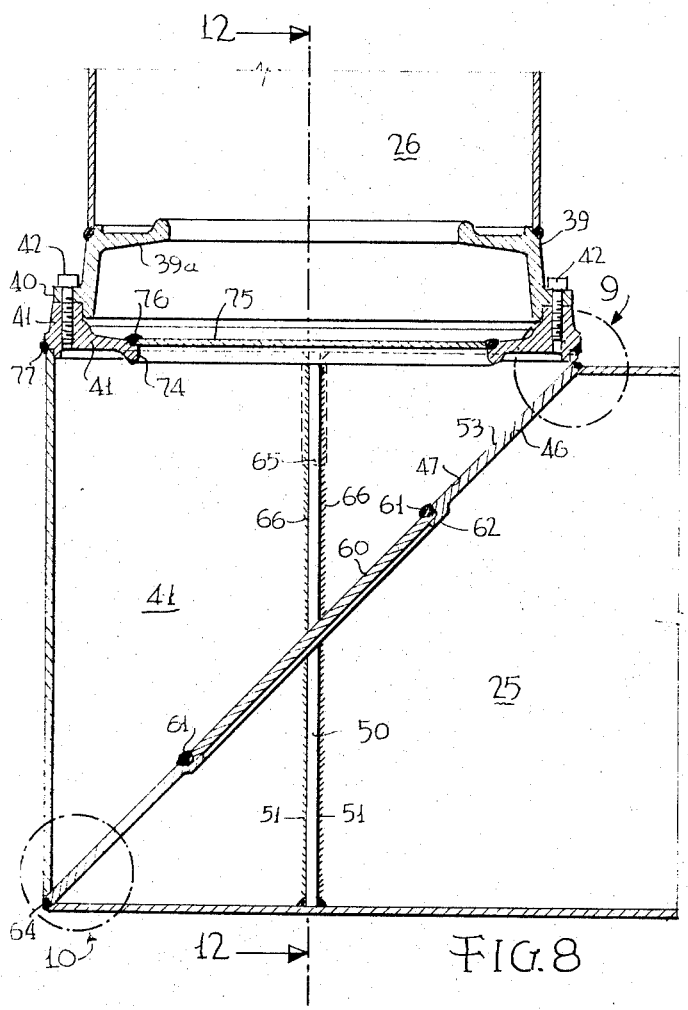
FIG. 8 is a sectional view like FIG. 5 but showing the parts at a further stage of assembly.
Figure 7:
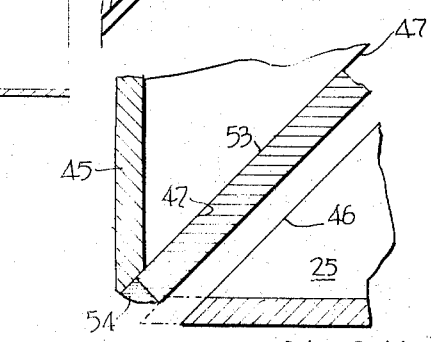
FIG. 7 is a further enlarged sectional view of the parts shown in the lower circled area 7 of FIG. 5.
Figure 9:
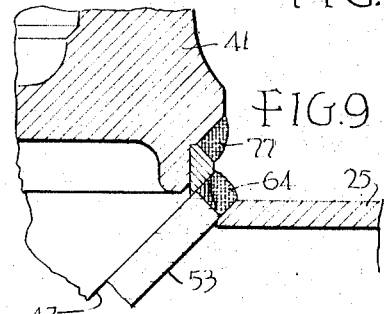
FIG. 9 is a further enlarged sectional view of the parts shown in the upper circled area 9 of FIG. 8.
Figure 10:
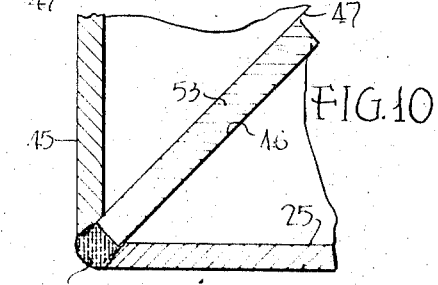
FIG. 10 is a further enlarged sectional view of the parts shown in the lower circled area 10 of FIG. 8.
Figure 11:
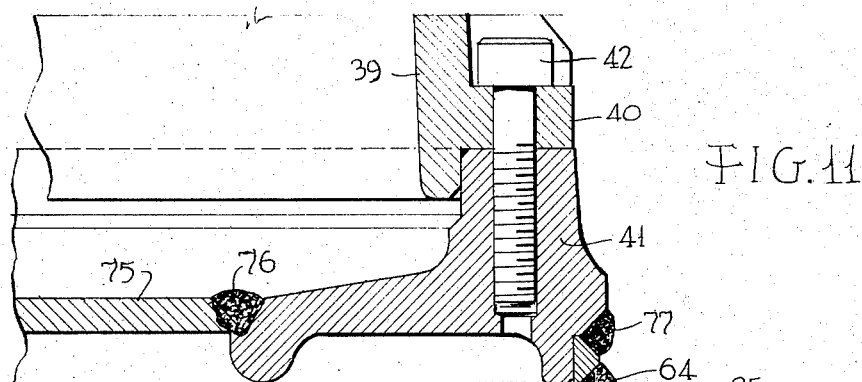
FIG. 11 is a further enlarged sectional view of the parts shown in the larger upper circled area 11 in FIG. 8.

As shown in the accompanying drawings, an airport transfer vehicle comprises a chassis 20 and a body or pod 21, shown in broken lines and in an elevated position on the chassis. A much higher position can be attained but an intermediate elevated position is given to conserve space. Even so, it can be realized that when the large heavy body is in a raised position the lateral loads imposed by wind, uneven ground, and the like, can cause great bending forces to be transmitted into the chassis frame.

In order to provide some realization of the size and weight of a representative vehicle it is noted that the length of the body or pod is about 50 feet, about 60 feet with a connecting enclosed gangway extended; the width about 16 feet; the height from ground over the top column enclosure projections with body lowered about 25 feet, about 37 feet with the body raised; the wheel base length about 22 and width about 16 feet; distance between columns about 22 feet to centers; outside diameter of chassis beam about 30 inches and wall about three-eighth inch thick; and maximum gross weight with 150 passengers about 80,000 pounds or 40 tons.

The chassis 20 is provided with front wheels 22, rear wheels 23 and a chassis frame which includes a horizontal central longitudinal beam 25, a front vertical support column or strut 26, and a rear vertical support column or strut 27.

Herein the beam and columns are tubular units of large diameter and wall thickness, as mentioned. The rear wheels are mounted on a cross member which is rigid with and braced to the chassis frame at that end, nor specifically shown herein, and the front wheels are mounted on a cross member 30 which is pivoted on a horizontal longitudinal axis member 31 carried by a set of mounting elements 32 secured beneath the chassis frame. Yieldable brace members 33 in the form of fluid shock absorbers or automatic levelers with movement-locking means are secured between outboard pivot brackets 34 on the cross member 30 and pivot brackets 35 on the sides of the column 26. The wheels have steering movement on the cross member and steering control in the manner usual for automotive road vehicles. The side supports transmit large transverse bending or crushing loads into the front column and frame, the same situation but with greater crushing loads existing at the rear.

The body has guides 36 movable on the columns and is moved vertically by screws 37. The details of this guiding and elevating mechanism are not required for an understanding of the present invention.

The size of the chassis is so great that it is not feasible to ship it in assembled condition travelling alone or carried by any available rail or road transportation facilities, so the columns 26, 27 proper and the beam 25 are made as separate units, the columns each having bottom end member 39 with a flange 40 which mates with a supporting face on a base member 41 and being removably secured, as by bolts or screws 42 therebetween.

At each end the connection between the beam 25 and the column is provided by an end angle connection unit 45 which is also tubular and of the same diameter as the beam 25. This truncated end member 45 may be considered as part of the column although the main portion of the column is disconnectable therefrom.

Conveniently, the angular truncated tubular end member 45 may be cut from the end of the same tube stock from which the beam is formed. In any event, the beam 25 is provided with an angular cut end 46 and the truncated tubular end member 45 is provided with a mating angular cut end 47.

Preferably the end angle cuts are made at an angle of 45° to provide the desired 90° angle between beam and column. The truncated end member 45 and the outer angular end of the beam 25, may as stated, be considered to be part of the vertical column structure.

The great weight imposed upon the bottom of the front end of the beam 25 by the front wheel pivot support 31 tends to collapse or deflect the wall of the tubular beam, and the same situation exists at the rear. In order to stiffen and strengthen the end joint a semicircular vertical reinforcing plate 50 is secured in the open end of the beam, as by fillet welding 51 on the sides. Welding here is easy because the plate is located at about the middle of the length of the cut end which is open at the top and also because the beam tube is of large diameter.

In order to provide great stiffening at the angular joint and furnish adequate metal support for heavy welds, an angle transition plate 53 is secured between the angular ends 47, 46 of the beam 25 and end member 45. This plate may initially be secured to either the beam 25 or the end member 45; but since the end member 45 is relatively small and readily turned abut for access, the plate is preferably secured first to it, as illustrated. Initial securement is made by fillet welding 54, the periphery of the plate being made sufficiently small to provide space for the fillet weld without leaving unsightly protruding weld material.

The plate 53, which is oval in form, initially is annular, the center being open for access in making filled welds 56 between the plate 53 and the beam plate 50. This opening in the angle plate 53 is later filled by a center plate 60 which is secured, as by fillet welding 61. A flange ring 62 is provided to hold the plate 60 in location for welding, this flange either being integral with the annular plate 53 or preassembled on it.

If desired for greater strength, the center plate 60 may be provided with a slot and the upper edge of plate 50 provided with a projection (not shown) extending through the slot and welded thereto after the center plate has been installed.

In final assembly, the angle plate 53 is secured to the angular end 46 of the beam 25, as by fillet welding 64.

The brace brackets 35 for the wheels imposed heavy side loads tending to crush or deflect the sides of the tubular member 45 locally, as explained, so to resist this local crushing load, reinforcing means, such as vertical plates 65 are secured within the end member at the bracket locations. This reinforcement might extend completely across the interior space of the end member, from one side to the other, if necessary; but with the adjacent transverse plates hereby provided, the local vertical plates have been found to be adequate. They are secured, as by fillet welding 66. The lower ends of the vertical plates 65 are secured to the plate 53, as by welds 68. The upper ends of the vertical plates 65 are secured beneath the base member 41, as by welds 70.

The base member 41 is provided initially with a center opening 73 having a bottom flange 74 and this opening, in final assembly, is closed by a center plate 75 secured, as by filled welding 76.

The base member 41 is secured to the tubular end member, as by fillet welding 77.

Figure 13:
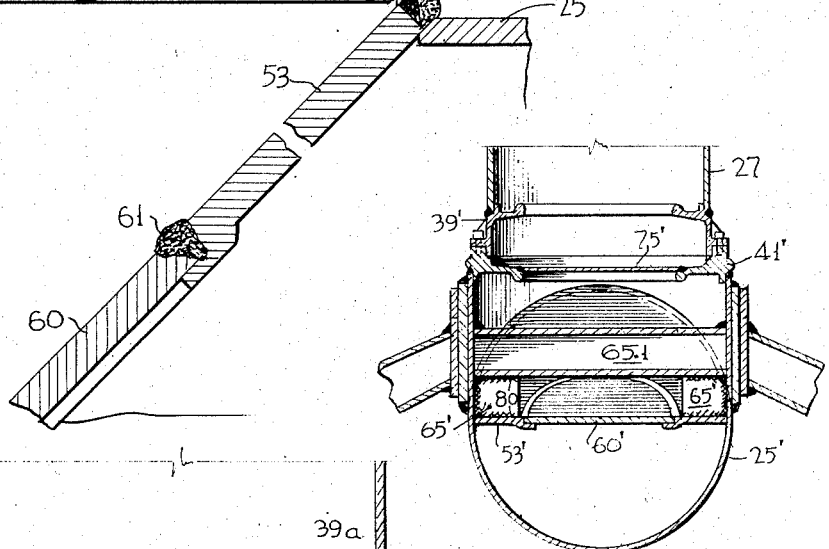
FIG. 13 is a vertical transverse section similar to FIG. 12 but showing a modified embodiment for taking greater transverse crushing loads.
Figure 12:
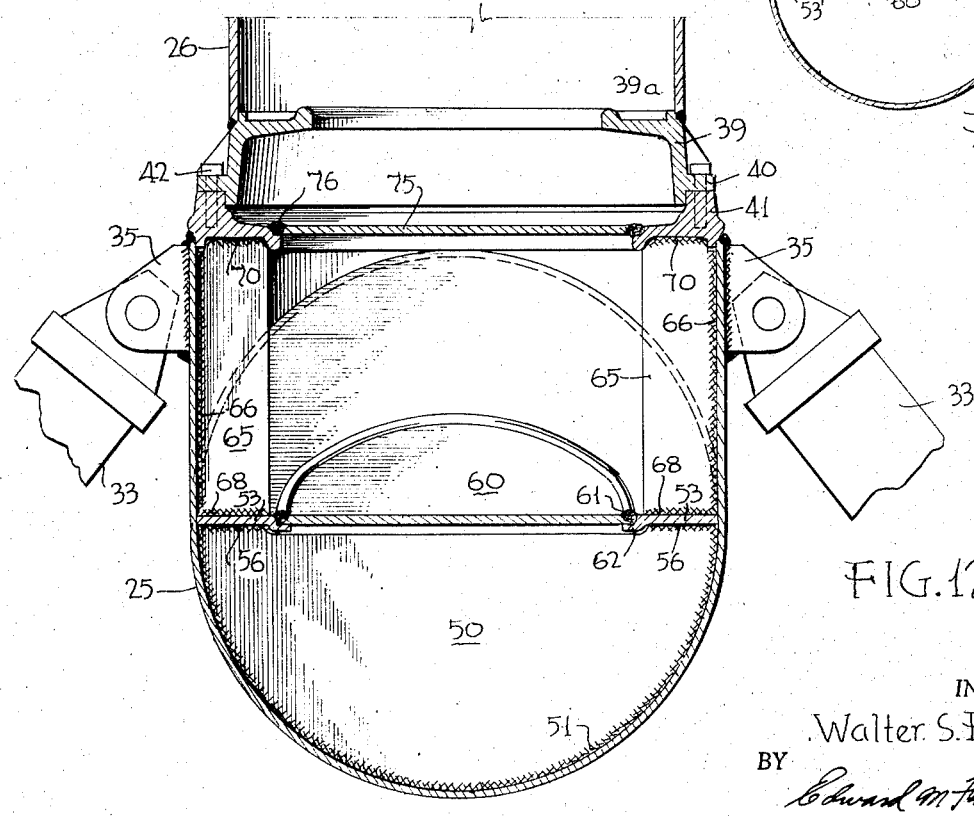
FIG. 12 is a transverse vertical sectional view taken on the line 12—12 of FIG. 8.

FIG. 13 shows a modified embodiment used at the rear end where the rear wheels impose greater transverse crushing loads on the tubular end member 45'. Most parts are like those described for the front end and are designated by the same reference characters with a prime(') added. The difference consists in having a transverse strut 65.1 extend completely across the inner diameter of the tubular member 45' above the vertical plates 65', being welded around the ends at 80. The cross strut 65.1 is preferably rectangular in cross section. The part of vertical plates 65' above the tubular strut 65.1 is not needed when the tubular cross strut is present, hence is omitted in FIG. 13.

The order of assembly is largely explained above. The vertical plate 50 is in the open end of the beam tube 25. All of the components of the end unit 45, except the closure plates 60 and 75, are preferably welded on before the end assembly is welded to the end of the beam 25. Conveniently, the vertical reinforcement plates 65 are welded in first; also the cross strut of FIG. 13 when used. Then the annular plate 53 and the annular column component support member 41 are welded into the openings of the end member 45. Then the ends of the vertical plates 65 are welded to the annular plates 41 and 53, the unit being inverted, if desired, to work through the opening of the plate 53 in making the upper end welds 70. Then the end unit is welded to the end of the beam 25 at the weld line 64. The welds 56 is between the beam plate 50 and the annular plate 53 can be made by working through the opening of the plate 53. Thereafter, the closure plate 60 is welded in at 61 and after that the closure plate 75 is welded in at 76. The welded-on (at 39b) column bottom member 39 has a transaxial reinforcing platelike element interior stiffening element 39a, here annular.

Alternatively, the plate 53 could be first welded to the end of the beam 25 and to the upper edge of its stiffening plate 50 and thereafter the end assembly 45 with its attachments welded on. If desirable, the base member 41 could be welded to the end member 45 and its stiffening plates 65 after the the assembly is otherwise complete except for welding in the closure plates 60 and 75.

It will be seen that this construction provides an extremely strong and rigid connection between the beam 25 and the base of the columns 26, 27 and a sturdy support for the columns when they are finally secured at their bases into the chassis assembly at the airfield by the bolts 42.

While one embodiment and a detail modification have been described for purposes of illustration, it is to be understood that there may be various embodiments and modifications within the general scope of the invention.

I claim:

1. A vehicle chassis frame construction, comprising in combination, a tubular longitudinal beam having its end disposed at a miter angle to its axis, a stub tubular end member having a miter end mating with the miter end of the beam and its axis disposed normal to the axis of the beam, an angle plate welded between said miter ends of the beam and end member, and axially extending transverse reinforcing means in said end member welded to said plate.

2. A vehicle chassis frame construction as set forth in claim 1, wherein said axially extending reinforcing means includes a plate element welded in said beam and to said angle plate.

3. A vehicle chassis frame construction as set forth in claim 1, wherein said angle plate and transverse reinforcing means forms an initial assembly in said end member and is welded to the end of the beam and its plate element in final assembly.

4. A vehicle chassis frame construction as set forth in claim 3, wherein said angle plate initially is annular for connecting parts through it, and a plate welded in the opening of said angle plate in final assembly.

5. A vehicle chassis frame construction comprising, in combination, a tubular longitudinal frame beam, a tubular stub column supporting member secured to said beam, said column supporting member and said beam being connected at a miter angle, a reinforcing angle plate disposed across the joint region of said beam and said member and secured to each, vertically disposed reinforcing plates in a plane normal to said beam extending on diametrically opposite interior sides of said stub support member and above said angle plate, and welded to said stub support member and said angle plate.

6. A vehicle chassis frame construction as set forth in claim 5 including an annular base member affixed to the upper periphery of said stub support member, the upper edges of said vertically disposed reinforcing plates being secured by welding to said annular base member.

7. A vehicle chassis frame construction as set forth in claim 6 wherein said annular base member is centrally apertured, the aperture being closed by a center plate.

8. A vehicle chassis frame construction of claim 5 including a reinforcing plate welded to said beam.

9. A vehicle chassis frame construction of claim 8 wherein said reinforcing plate in said beam is also welded to said angle plate, said reinforcing plate in said beam and said reinforcing plates in said stub support member lying in the same plate.

10. A vehicle chassis frame construction comprising, in combination, a tubular longitudinal frame beam, a tubular stub column supporting member secured to said beam, said column supporting member and said beam being connected at a miter angle, a reinforcing angle plate disposed across the joint region of said beam and said member and secured to each, vertically disposed reinforcing plates in a plate normal to said beam extending on diametrically opposite interior sides of said stub support member and above said angle plate and welded to said stub support member, and a transversely extending strut extending across the interior of said stub support member and welded thereto at its ends, the upper edges of said plates welded to said transverse strut.

* * * * *